Feb. 22, 1966 N. A. PIERSON 3,236,605
SYSTEM FOR CONTROLLING THE ADDITION OF LIQUIDS TO REFUSE
Filed Dec. 18, 1961 3 Sheets-Sheet 1

INVENTOR.
NORMAN A. PIERSON
BY
Dunlap, Laney & Hubbard
ATTORNEYS

Feb. 22, 1966  N. A. PIERSON  3,236,605
SYSTEM FOR CONTROLLING THE ADDITION OF LIQUIDS TO REFUSE
Filed Dec. 18, 1961  3 Sheets-Sheet 3
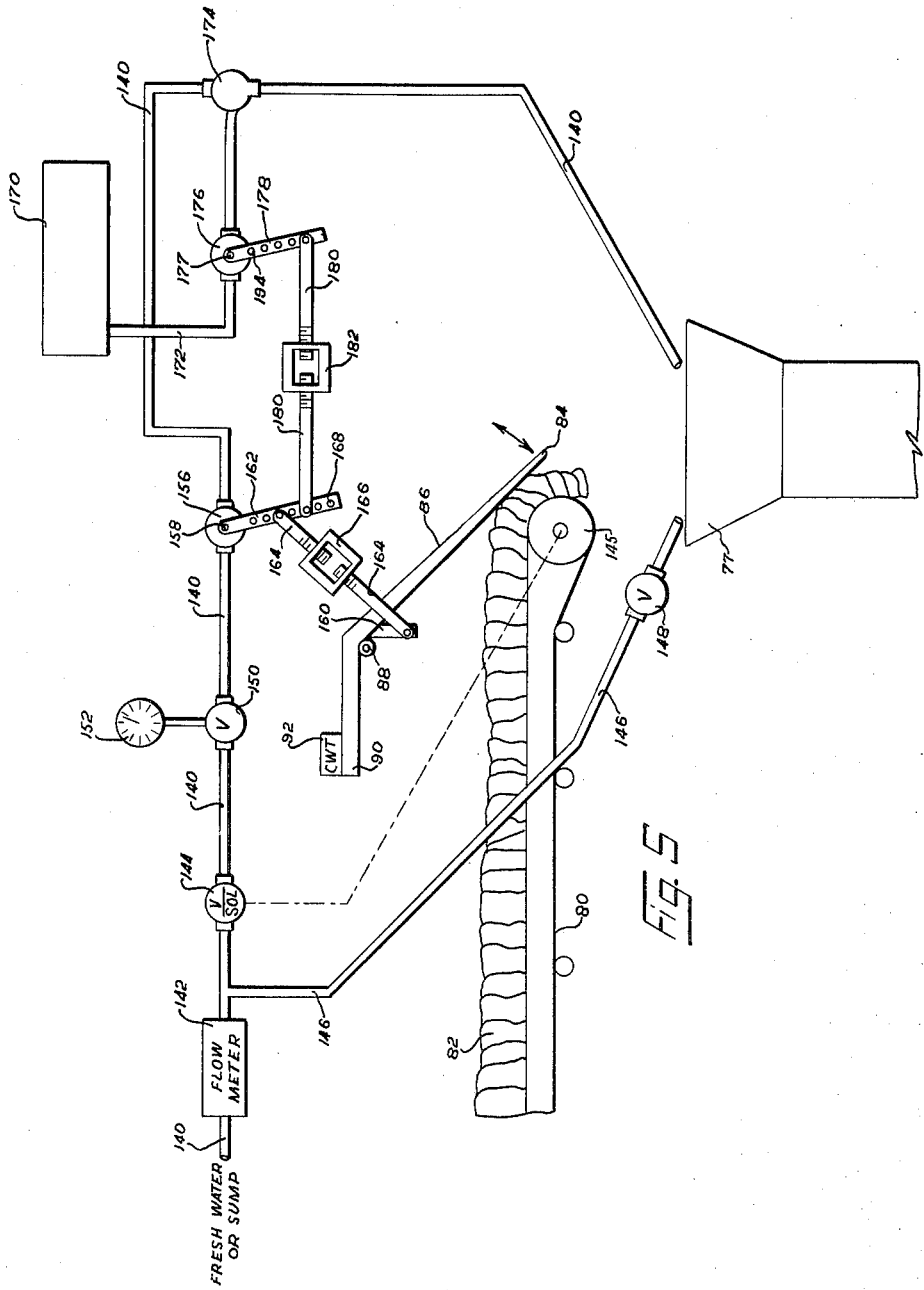
INVENTOR.
NORMAN A. PIERSON
BY
Dunlap, Laney & Hubbard
ATTORNEYS

3,236,605
SYSTEM FOR CONTROLLING THE ADDITION OF LIQUIDS TO REFUSE
Norman A. Pierson, P.O. Box 755, Norman, Okla.
Filed Dec. 18, 1961, Ser. No. 160,219
11 Claims. (Cl. 23—259.1)

This invention relates to a system for controlling the addition of liquids to a comminuted refuse material such as municipal refuse and the like. More particularly, but not by way of limitation, the invention relates to a method and apparatus which permit a plurality of fluids to be thoroughly mixed in a desired proportion, and the mixture then added to refuse material in optimum quantities or at an optimum rate.

The invention, in whole or in one or more aspects, is novelly adapted for use in adding liquids to a variety of solid or semi-solid particulate materials. However, it has been conceived primarily with a view to the solution of the problem of effecting the proper adjustment of moisture content, carbon content and nitrogen content in refuse material which is to be converted to compost by bacterial action. It is perhaps most novel and useful, therefore, in its approach to, and solution of, this problem.

In conversion of refuse materials to compost by bacterial action, it is essential that optimum conditions for bacterial growth and reproduction be provided. Such optimum conditions include, among others, a certain moisture content range, and the proper ratio between the total carbon content and the total nitrogen content of the refuse. This latter value, termed the C/N ratio, is especially important in promoting rapid bacterial growth and reproduction.

The refuse material which is most frequently converted to compost in a large scale composting operation is municipal refuse. In its raw state; that is, as it is collected by garbage and refuse collection trucks, municipal refuse contains a large amount of carbonaceous material. In most instances, the ratio of carbon to nitrogen which characterizes municipal refuse is higher than that which is optimum in composting operations. It is also seldom that the moisture content of the raw municipal refuse as it is received at the composting plant happens to be that which is most effective in promoting the desired bacterial action.

In order to adjust the moisture content and the C/N ratio of refuse to the desired level prior to composting the refuse, it is generally the practice to add the necessary amount of water, and also a nitrogen-containing chemical, such as ammonia, to the refuse before it enters the digestion zone where bacterial activity converts the refuse to compost. Although a number of devices for adding water to solid and semi-solid materials have been developed in the past, these have generally proven unsatisfactory for continuously modifying the moisture content of municipal refuse to suit subsequent composting operations. As a result, the determination of the inherent moisture content of the raw refuse has usually been made by squeezing a portion of the raw refuse to evaluate the amount of water retained therein, and then adding an additional amount of water sufficient to bring the moisture content of the refuse up to the desired level. In most such instances, the amount of water which should be added to the refuse has been primarily a matter of conjecture, and the moisture content of the refuse entering the bacterial digestion cells has therefore also been variable within wide limits.

Another disadvantage of the previous methods utilized for controlling the moisture content of refuse to be composted, is the failure of such methods to economically utilize the bacteria-enriched drippings or drainage from the raw refuse which is accumulated when the refuse is received. In other words, after the raw refuse has been received at the composting plant, the various liquids which are contained therein, including fruit juices, milk, water, etc. are permitted to drain from the refuse and are collected in a sump along with varying amounts of water used to wash down the receiving area. From the sump, these liquids are discharged into a sewer, or are otherwise permanently disposed of. Such disposal of these liquids actually represents a considerable loss of valuable bacteria which could be utilized to good advantage in the later composting operation, since such bacteria are, in fact, present in large numbers in the fluids which have accumulated in the raw refuse. Moreover, the use of these liquids for subsequently bringing the moisture content of the refuse up to the desired level would eliminate a considerable portion of the fresh water which otherwise must be used for this purpose, thus substantially improving the economy of the composting operation.

Finally, the addition of the nitrogen-containing chemical separately from the water which is added to the refuse generally results in a failure to distribute the nitrogen-containing chemical evenly throughout the entire mass of refuse. This is particularly true where the nitrogen-containing chemical which is added is in solid form, such as pulverized or granulated ammonium nitrate.

The present invention provides a novel system for adding a liquid mixture of water and a nitrogen-containing chemical to a refuse material which is subsequently to be composted. The preferred nitrogen-containing chemical which is utilized is aqueous ammonia, and the water and aqueous ammonia are thoroughly intermixed in any desired proportion prior to their addition to the refuse. The mixing of the ammonia with the water assures that the distribution of ammonia throughout the refuse will be relatively even.

The invention further includes novel means for utilizing in place of fresh water, the liquids which have been drained from the raw refuse when it is received for addition to the refuse in order to bring the moisture content thereof to the desired level. In this way, the beneficial bacteria and fungi which are contained in the fluids extracted from the raw refuse are not discarded, but are conserved and utilized in the subsequent bacterial composting operation. The system functions so that the collected liquids which have been drained from the raw refuse are utilized whenever they are available to supply the water which must be added, thus saving the expense of a substantial amount of fresh water which would otherwise have to be utilized, and substantially improving the economy of the process.

In order to provide continuous control of the moisture content of the refuse, means are provided for constantly sensing the quantity of refuse which is being directed into the digestion cells for conversion to compost, and also for determining the innate moisture content of the particular refuse which is to be composted. In other words, to determine the amount of water which must be added to the refuse to bring the moisture content thereof within the range which is optimum for the desired subsequent bacterial action, it is necessary to know the rate at which the refuse is being fed to the digestion cells of the plant and, additionally, it is necessary to know the inherent moisture characteristic of the particular refuse which is being charged to the plant at any given time. The present invention makes provision for the determination of each of these variables in order to properly control the amount of water and ammonia which is added to the refuse at any time.

An additional important feature of the invention is the provision of means for preheating the mixture of water and ammonia prior to its addition to the refuse. With such preheating, the refuse is brought more nearly to the condition in which bacterial growth and reproduction proceeds at an optimum rate, and thus renders the composting action of the bacteria more efficient. The heating of the additive liquid mixture is preferably effected by utilizing hot air which is obtained from some of the digestion cells as a result of the thermophilic action of the bacteria upon the refuse therein. Since it is desirable that some of the heat developed by the bacterial action in some of the composting cells be removed therefrom in order to prevent the temperature in the cell from exceeding that which is optimum for bacterial action, the utilization of this excess heat to warm the mixture of water and ammonia prior to its addition to the refuse constitutes a feature which substantially improves the efficiency and economy of the overall operation.

From the foregoing discussion, it will be apparent that a broad major object of the present invention is to provide a system for continuously and accurately controlling the chemical content of a refuse material such as municipal refuse and the like, which material is to be subsequently converted into useful products.

A more specific object of the present invention is to provide a method and apparatus for quickly and efficiently bringing the moisture content, and the carbon to nitrogen ratio of municipal refuse which is to be composted to the optimum levels for the uninhibited bacterial digestion which is utilized to convert the refuse to compost.

Another object of the present invention is to efficiently utilize the liquids which are extracted from raw municipal refuse for accurately controlling the moisture content of the refuse prior to subsequently converting the refuse to compost.

A further object of the present invention is to provide a system for effectively utilizing the excess heat generated in the bacterial decomposition of municipal refuse for preheating the refuse prior to the time it is charged to digestion cells in which the bacterial activity occurs.

Yet another object of the present invention is to provide a system for automatically and accurately controlling the moisture content of refuse material which is subsequently to be converted to useful products, with such control being automatically correlated to the rate at which the refuse is fed to the conversion apparatus, and to the innate moisture content of such refuse.

Another object of the present invention is to provide means for continuously and accurately controlling the carbon to nitrogen ratio of refuse which is to be subsequently converted to compost by bacterial digestion.

Another object of the present invention is to provide a system for accurately and continuously controlling the chemical content of a refuse material which is subsequently to be converted to useful products, which system is relatively simple and inexpensive in construction, and is characterized by a long and trouble-free operating life.

Other objects and advantages will become apparent to the reader as the description of the invention in greater detail progresses hereinafter. The accompanying drawings illustrate my invention, and will aid the reader in appreciating the salient features and advantages of the invention.

In the drawings:

FIG. 5 is a diagrammatic illustration of a modified embodiment of the invention.

Figure 1:
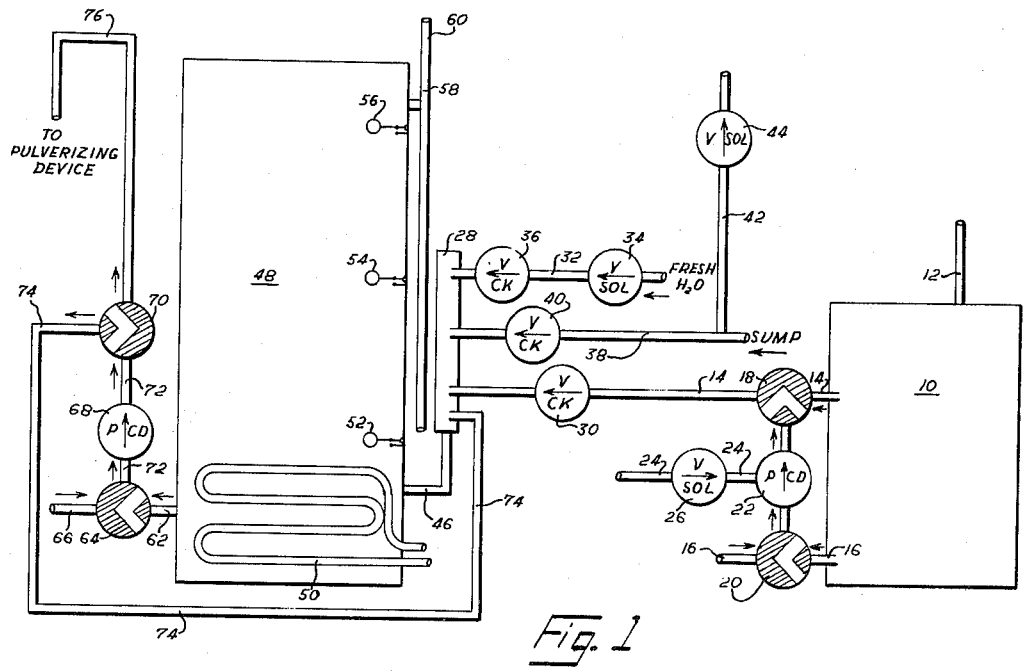
FIG. 1 is a schematic flow diagram showing the apparatus of the present invention which is utilized for mixing in predetermined proportions, a plurality of liquids which may desirably be added to refuse material in order to adjust the chemical content of the refuse to an optimum level for purposes of subsequent processing.

Referring now to the drawings in detail, and particularly to FIG. 1, a source of a chemical which may be desirably added to the refuse material is designated by reference character 10. In the preferred embodiment illustrated in FIG. 1, the source of this chemical constitutes a large, vertical storage tank, and the chemical contained therein is aqueous ammonia. In processes by which refuse such as municipal refuse is converted to a beneficial organic compost, it is highly desirable that the carbon to nitrogen ratio of this refuse be adjusted to an optimum level in order for bacterial digestion of the refuse to proceed at the desired rate. Since the carbon content of the refuse is generally sufficiently great to result in an undesirably high $C/N$ ratio in the raw refuse, the addition of the nitrogen-containing ammonia to the refuse results in a lowering of the $C/N$ ratio to the desired level.

The storage tank 10 containing the aqueous ammonia is provided with a vent pipe 12 at the top thereof and a pair of conduits 14 and 16 extending from one side thereof. A pair of three-way valves 18 and 20 are located in the conduits 14 and 16, respectively, and are interconnected through a fluid-powered, positive displacement pump designated by reference character 22. The fluid-powered, positive displacement pump 22 is driven by a fluid which is fed to the pump through a conduit 24, and the flow of the fluid through this conduit is controlled by a solenoid valve 26.

From the ammonia storage tank 10, the conduit 14 extends to a mixing manifold designated by reference character 28, and contains a check valve 30 which prevents liquid from flowing from the mixing manifold 28 back to the three-way valve 18 when the pump 22 is inoperative. In order to mix a supply of fresh water with the aqueous ammonia from the tank 10, a conduit 32 extends from a water supply (not shown) through a solenoid valve 34 and a check valve 36 to the mixing manifold 28.

For reasons of economy and as well as efficiency of operation, it is desirable to utilize the liquids which have been collected from the raw refuse as it is received, instead of fresh water delivered to the mixing manifold 28 through the conduit 32. Therefore, another conduit 38 is provided for delivering the drainings and drippings collected from the raw refuse in a sump (not shown) into the mixing manifold 28. The conduit 38 is provided with a check valve 40 for preventing liquid from the manifold 28 from backing up in the conduit 38. A by-pass conduit 42 is also provided through which liquids from the sump may be diverted around the mixing manifold 28, and either returned to the sump, or discharged to a sewer, etc. In order to control the flow of the sump liquids to the manifold 28 or through the by-pass conduit 42, a solenoid valve 44 is provided in the by-pass conduit 42.

Although the mixing manifold 28 may be any suitable type of mixing device, I prefer to utilize an elongated vertical cylindrical chamber having internal baffles or vanes (not seen) arranged to promote mixing of the liquids therein. The conduits 32 and 38 which bring the fresh water and sump liquid, respectively, to the mixing manifold 28 are tangentially attached to the sides of the manifold in a position to feed their respective liquids to the manifold in a tangential direction. In this way, the mixing of the liquids is considerably enhanced.

From the bottom of the mixing manifold 28, a conduit 46 extends downwardly and is connected to the bottom of a large vertical storage tank 48. A coiled conduit 50 is provided in the bottom of the storage tank 48 for conveying a medium for heating the liquid contents of the storage tank in a manner hereinafter described in greater detail. The storage tank 48 is provided with three vertically spaced float switches, 52, 54 and 56. To prevent the storage tank 48 from becoming filled with liquid above a certain maximum height, an overflow conduit 58 communicates with the interior of the storage tank near the top thereof. The overflow conduit 58 is provided with an atmospheric vent 60 which permits gases evolved in the storage tank to be vented to the atmosphere.

Near the bottom of the storage tank 48, a discharge conduit 62 is provided and is connected to a three-way valve 64. A second port of the three-way valve 64 is connected to an intake conduit 66, and the third port of the three-way valve is connected through a motor driven, positive displacement pump 68 to a three-way valve 70 by means of conduit 72. The second port of the three-way valve 70 is connected by conduit 74 to the bottom of the mixing manifold 28, and the third port of this three-way valve is connected to a conduit 76 which extends into a comminuting or pulverizing device 77 (see FIGURE 3) used to reduce the particle size of the refuse prior to the introduction of the refuse into the bacterial digestion cells. A horizontal, constant speed conveyor 80 is used to convey refuse 82 which is subsequently to be converted to useful products from a preliminary processing operation to a second treating operation.

Figure 2:
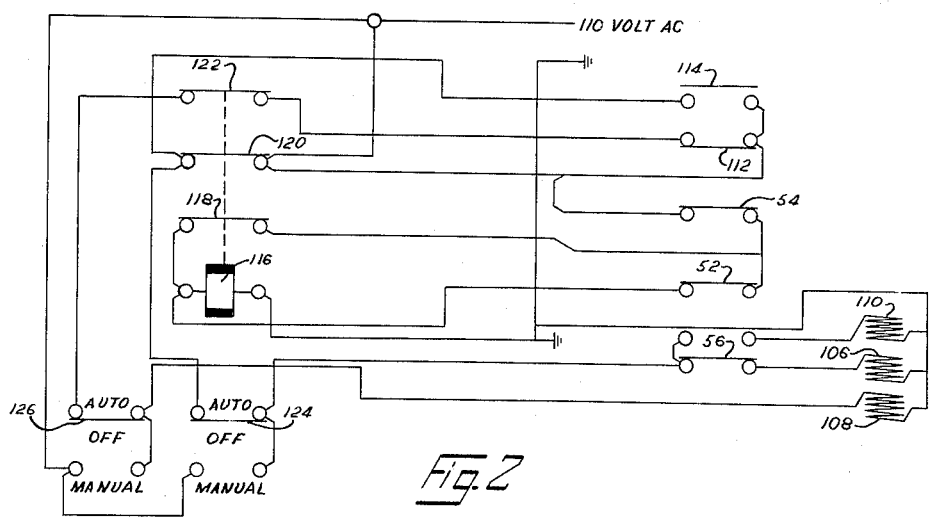
FIG. 2 is an electrical circuit diagram illustrating the electrical circuitry utilized to control the amounts of each liquid added to the storage tank depicted in FIGURE 1.

Referring next to FIGURE 2 of the drawings, the electrical circuitry which is utilized to control the introduction of liquids into the storage tank 48 is illustrated. In the circuit diagram, the vertically spaced float switches 52, 54, and 56 are illustrated. The coils of the solenoid valves 26, 34 and 44 are also illustrated and are designated by reference characters 106, 108 and 110, respectively. In addition to these circuit elements, the circuit of FIGURE 3 includes a pair of switch contacts 112 and 114 which are located on the sump pump (not shown). The switch contacts 112 and 114 are closed and open, respectively, when the sump pump is not running and, conversely, are open and closed, respectively, when the sump pump is in operation. A relay 116 is connected in series with the lowermost float switch 52 and is adapted to close switches 118, 120 and 122 when the float switch 52 is closed. Switch 118 is connected in series with the centrally located float switch 54 and the relay 116 so that the closure of switch 118 closes a holding circuit to the relay 116 which remains closed even after the lowermost switch 52 is opened, provided the central float switch 54 is closed. In order to provide the option of automatic or manual control of the level of liquid in the storage tank 48, a pair of double throw switches 124 and 126 are connected in the circuit including the solenoid coils 106 and 108, respectively.

Figure 3:
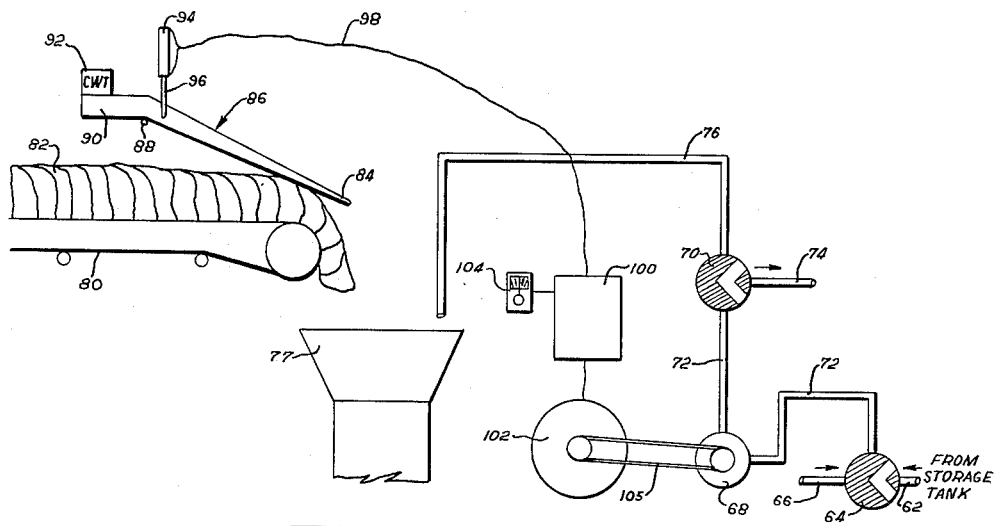
FIG. 3 is a schematic flow diagram illustrating the portion of the system of the present invention which is utilized to control the rate at which a liquid mixture of certain chemicals is added to refuse material which is subsequently to be converted to useful products.

In FIGURE 3 of the accompanying drawings, the system which is utilized in a preferred embodiment of the invention for driving the positive displacement pump 68 is schematically illustrated. In bacterial composting plants, such a conveyer is frequently located between a device (not seen) for initially grinding the raw refuse into relatively fine and uniform particles, and a second device 77 which is utilized to effect a further grinding and pulverization.

Due to the unusual property of municipal refuse and similar substances of agglomerating or cohering to form a relatively rigid mass across a substantial distance, the refuse 82 which is carried on the conveyor 80 forms a bed thereon, having a relatively uniform depth transversely across the conveyor. Adjacent the end of the conveyor 80, the refuse 82 is contacted at its upper surface by the lower end 84 of a pivotally supported paddle member 86. The pivotal axis 88 of paddle member 86 is disposed at some position intermediate the length of the paddle member, and the end 90 of the paddle member opposite its end 84 is provided with a suitable counterweight 92. This permits the paddle member 86 to be pivoted about its pivotal axis 88 by a minimum of force applied to the end 84 thereof.

Figure 4:
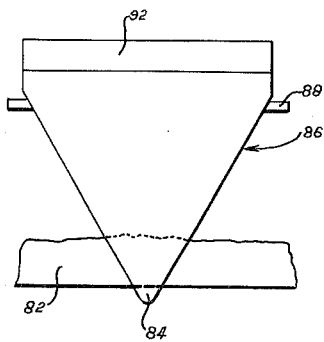
FIG. 4 is a view in elevation of the paddle member which is utilized to sense the rate of feed of refuse toward the subsequent processing operations by which the refuse is converted to useful products.

The paddle member 86 may take any desired form, but is preferably reduced in width toward its lower end 84 as shown in FIGURE 4, in order to reduce the mass of the paddle. The refuse 82 on the conveyor 80 will be substantially level across the width of the conveyer by reason of the agglomerating tendency of the refuse and the vibration of the conveyor. Therefore, the end 84 of the paddle member 86 only needs to extend a minor portion of the way across the width of the conveyor to be pivoted by variations in the depth of refuse being dropped off the discharge end of the conveyor.

A suitable variable electrical resistance 94 is mounted above the paddle member 86 and is mechanically connected thereto by a suitable connecter 96 so that pivotation of the paddle member 86 will cause the resistance of the variable resistor 94 to be varied by an amount corresponding to the amount by which the paddle member is pivoted. The variable resistor 94 is electrically connected by leads 98 to the control winding 100 of a variable speed motor 102. The motor 102 may be of any suitable type capable of having its speed of operation altered by variation of a variable resistor. A second variable resistance or a potentiometer is attached to the control winding 100 of the variable speed motor 102 and is designated by reference character 104. This variable resistance 104 may be manually adjusted as desired and is provided for the purpose of permitting the speed of the motor 102 to be varied in correspondence to the variation in the connate moisture content of the various types of refuse which may be processed in the composting plant.

As further shown in FIGURE 3, the variable speed motor 102 is connected by a suitable driving belt or chain 105 to the positive displacement pump 68 so that the speed of the pump 68 is directly related to the speed at which the variable speed pump 102 is being driven.

*Operation*

As has been previously explained, in many processes of converting refuse to useful products, it is highly desirable and usually necessary that the moisture content of the refuse be adjusted to an optimum level prior to performing certain conversion operations upon the refuse. This is particularly true in the case of processes for converting refuse, such as municipal refuse, into compost material by bacterial action. In the latter process, it is not only necessary to bring the moisture content of the refuse within a certain range, but it is also highly desirable to adjust the ratio of carbonaceous material to nitrogeneous material in the refuse to a certain optimum value. In general, as raw refuse is received at a composting plant, it is initially dehydrated to the extent of allowing the various liquids entrapped therein to drain from the refuse. The liquids which are drained from the refuse are collected in a sump along with water used to wash down the area around the refuse receiving station. In most previous instances, these liquids have then been discharged to a sewer or otherwise permanently disposed of without further use in the process. After the raw refuse has been drained, it is subjected to an initial comminuting or grinding procedure in which the particle size of the refuse is substantially reduced. After this preliminary grinding, the refuse is passed on one or more conveyers into a secondary comminuting operation in which the refuse is pulverized to substantially smaller and relatively more uniform particles.

Although the moisture content and the C/N ratio of various types of refuse as received and after being drained will vary over a wide range, a typical municipal refuse which might be received in a composting plant may have a moisture content of 25 percent and a C/N ratio of 60. These values are those which obtain in the refuse as it is being conveyed between the initial grinding operation and the secondary or subsequent pulverizing operation. In order to bring the moisture content up to a value of around 35 or 45 percent and to drop the C/N ratio to about 30, values which are considered optimum for subsequent bacterial composting, it is necessary to add a substantial amount of water and a nitrogen-containing chemical to the refuse. For example, in a composting plant designed to compost 50 tons of the typical raw refuse referred to above within a given period, an additional 8,000 gallons of water must be added to the refuse during this period to achieve the desired moisture content. To drop the C/N ratio from a value of 60 to an optimum value of 30, 1,000 pounds of nitrogen or 260 gallons of 41 percent aqueous ammonia are required. The system of the present invention is capable of mixing, storing and applying a desired mixture of water and aqueous ammonia or, for that matter, any other combination of two or three liquids, with a minimum of attention.

Referring first to FIGURE 1 of the drawings, the rate at which the aqueous ammonia is supplied to the mixing manifold 28 from the ammonia storage tank 10 is controlled by the settings or sizes of the three-way valves 18 and 20 and the check valve 30 as well as the diametric size of the conduits 14 and 16. The rate at which fresh water is introduced into the mixing manifold 28 is controlled by the size of its conduit 32, the solenoid valve 34 and the check valve 36. The rate at which the material from the drainage sump is introduced into the mixing manifold 28 is controlled by the size of the conduit 38 and the size of the opening through the check valve 40. By proper selection of the sizes of these elements and by properly adjusting the settings on the various valves, the rates at which these several liquids are introduced to the mixing manifold 28 may be controlled as desired, and therefore the proportion of each component in the liquid mixture in the storage tank 48 may also be controlled as desired.

The three-way valves 18 and 20 used in conjunction with the ammonia storage tank 10 allow for greater flexibility of operation in that the ammonia storage tank may be charged by the introduction of fresh aqueous ammonia through the conduit 16, three-way valve 20, three-way valve 18 and the conduit 14 from barrels, tank trucks or other containers if desired. On the other hand, if it should be necesary or desirable to do so, ammonia from a different source may be directed into the mixing manifold 28 through the conduit 16, three-way valve 20 and three-way valve 18. A sampling valve may be provided in the conduit 16 between the three-way valve 20 and the ammonia storage tank 10 in order to permit the contents of the latter tank to be sampled periodically as desired.

The function of the float switches 52, 54, and 56 located in the liquid storage tank 48, and of the electrical circuitry associated with them is to maintain a certain minimum liquid level within the storage tank 48, and to assure that the liquid mixture which is charged to the storage tank through the mixing manifold 28 is constituted in the most economical and beneficial manner. By the most economical constitution of the liquid mixture in the storage tank 48 is meant a mixture of concentrated aqueous ammonia with liquid materials which have been drained from the raw refuse and collected in the sump. As has been previously explained, this liquid material is collected in the sump and is pumped by a sump pump (not shown) through the conduit 38 into the mixing manifold 28. At any given time, a sufficient amount of liquid material may be present in the sump to assure a supply of this material to the mixing manifold 28. Conversely, there may be periods when there is little or no liquid material in the sump, and in this event it will be necessary to supply fresh water through the conduit 32 to the mixing manifold 28 for mixing with the aqueous ammonia. When the collected drippings from the raw refuse exist in sufficient quantity to permit them to be mixed with the ammonia in the mixing manifold 28, this constitutes the preferred source of the aqueous diluent for the ammonia since it not only provides for more economical operation of the system, but also will improve the efficiency of the overall composting operation since these sump liquids are enriched with beneficial bacteria and fungi which play an important role in the subsequent bacterial composting. The advantages of innoculating such refuse with bacteria and fungi which play major roles in the subsequent conversion of the refuse to compost are well known to those experienced in the municipal refuse composting field. Yet this innoculation has usually been effected by the addition of bacteria derived from an external source instead of from the accumulated drippings and drainage from the raw refuse.

In order to control the input of ammonia, sump liquid and fresh water to the mixing manifold 28, the electrical circuitry illustrated in FIGURE 2 functions in the following manner.

When the liquid in the mixing tank 48 falls below the level of the lowest float switch 52, and the sump pump utilized to direct fluid from the sump to the conduit 58 is inoperative, all of the switches shown in FIG. 2 are in the positions illustrated. Thus, all three of the float switches 52, 54, and 56 are closed, and the relay 116 is energized to close switches 118, 120 and 122. The double-pole, double-throw switches 124 and 126 are also assumed to be thrown to their position for automatic operation of the system. In this status of the system, a circuit is completed through the coil 108 of the solenoid valve 34 in the fresh water conduit 32. This causes the solenoid valve 34 to open, permitting fresh water to be directed into the mixing manifold 28. Simultaneously, the coil 106 of the solenoid valve 26 in conduit 24 is energized, permitting power fluid to be received by the positive displacement pump 22 so that aqueous ammonia is pumped from the ammonia storage tank 10 through the conduit 14 into the mixing manifold 28.

With each of the fluids, that is the fresh water and the aqueous ammonia, being introduced to the mixing manifold 28 at predetermined rates, a mixture of predetermined proportions will be charged to the storage tank 48. As the level of the liquid in the storage tank 48 rises above the lowermost float switch 52, the float switch is opened. Due, however to the holding circuit which is established through the centrally located float switch 54 and the relay actuated switch 118, the relay 116 remains energized, and the switches 118, 120 and 122 remain closed. Thus, the fresh water and aqueous ammonia continue to be conducted into the mixing manifold 28, and from thence into the storage tank 48.

The level of liquid in the storage tank 48 continues to rise until the centrally located float switch 54 is opened. With the opening of this float switch, the holding circuit to the relay 116 is open, de-energizing the relay and allowing switches 118, 120 and 122 to open. The opening of the latter switches breaks the circuits to the coils 106 and 108 of the solenoid valves 26 and 34, respectively. This permits these solenoid valves to close preventing the further flow of aqueous ammonia and fresh water into the mixing manifold 28 through their respective conduits. The status of the circuit elements then remains unchanged except for the closure of the central float switch 54 until the level of the liquid in the storage tank 48 again drops below the level of the lowermost float switch 52. At this time, the cycle is repeated as described above.

As initially indicated in the described operation of the system thus far, it has been assumed that no liquid was accumulated in the sump for charging to the mixing manifold 28, and that therefore the sump pump was not actuated and the contacts associated with the pump were in the status illustrated in FIGURE 2. Assuming now, however, that a substantial amount of liquid which has drained from the raw refuse as received has been accumulated in the sump, the sump pump contacts 112, 114 are reversed in their status so that contacts 112 are now open and contacts 114 are closed. This will be the situation when the sump pump has been energized to pump liquid from the sump through conduit 38 to the mixing manifold 28.

When the liquid level in the storage tank 48 drops below the lowermost float switch 52, a circuit is again made through the coil 106 of solenoid valve 26, through the switch 124, and through relay actuated switch 120. The positive displacement pump 122 is therefore actuated to commence the delivery of aqueous ammonia from the tank 10 into the mixing manifold 28. The coil 108 of the solenoid valve 34 in the fresh water conduit 32 is, however, not energized at this time since its circuit is broken by the opening of the contact 112 associated with the sump pump. Instead, aqueous material from the sump is pumped by the sump pump through the conduit 38 into the mixing manifold 28 in place of the fresh water. The solenoid valve 44 located in the by-pass conduit 42 is at this time closed to prevent the by-passing of the sump liquid through the by-pass conduit 42 instead of into the mixing manifold 28.

With the circuit in this status, aqueous ammonia and the aqueous sump liquid continue to be pumped into the mixing manifold 28 at the desired rate to produce a mixture of predetermined proportions. The mixture enters the storage tank 48 by way of the conduit 46 and the liquid in the storage tank continues to rise until the centrally located float switch 54 is again opened. At this time, however, despite the deenergization of the relay 116 with the consequent opening of relay actuated switches 118, 120 and 122, the positive displacement pump 22, and the sump pump (not shown) continue to operate and to supply aqueous ammonia and sump liquid, respectively, to the mixing manifold 28. This is because the circuit to the coil 106 of solenoid valve 26 continues to be energized by means of a circuit made through the contact 114 of the sump pump, and because the sump pump is operated independently of the illustrated circuitry and in accordance with the availability of liquid which has been collected in the sump. It will therefore be apparent that the liquid level in the storage tank 48 continues to rise even after the centrally located float switch 54 has been opened.

The ascendency of the liquid level in the storage tank 48 continues until such time as it reaches the uppermost float switch 56. At this time, the top float switch 56 is shifted from its position shown in FIGURE 2 to an alternate position in which a circuit to the coil 110 of the solenoid valve 44 is closed. The energization of the coil 110 of solenoid valve 44 causes this valve to open. As the solenoid valve 44 in conduit 42 opens, the sump liquid is diverted through conduit 42 by reason of the considerably lower pressure which opposes its flow through this conduit than opposes its flow through the conduit 38 into the mixing manifold 28. The sump liquid which is by-passed or diverted through the conduit 42 may then be recirculated through the sump until such time as the sump pump is shut off or de-energized, or it may be diverted into a sewer for permanent disposal. Because of the valuable organisms entrained in the sump liquid, however, the former procedure is preferable. Simultaneously with the actuation of the solenoid valve 44 by the throwing of the top float switch 56, the circuit to the coil 106 of the solenoid valve 26 is broken, causing the latter valve to close cutting off the supply of motive fluid to the positive displacement pump 22. The pump 22 therefore ceases to operate and no additional aqueous ammonia is supplied to the mixing manifold 128.

As a safety precaution against malfunction of the electrical system as thus far described, an overflow pipe 58 is provided on the outside of the storage tank 48 and communicates with the interior of the storage tank at the top thereof. A suitable vent 60 is provided at the top of the overflow pipe 58 to allow ammonia and other gases which may be evolved in the storage tank 48 to be vented to the atmosphere.

In the process of converting refuse to compost by bacterial digestion, it is highly desirable to slightly warm or preheat the refuse prior to charging it to the cells in which the bacterial digestion takes place. In order to accomplish such preheating, a coiled conduit 50 is provided in the bottom of the storage tank 48 for conveying a heated fluid, such as air or steam, into heat exchange relation with the liquid in the storage tank. Although any suitable source of such heated fluid may be utilized, when the system is utilized for adjusting the chemical content of refuse which is to be subsequently composted, a more efficient overall operation can be obtained by utilizing a portion of the warm air which is produced by the thermophilic action of bacteria in the digestion cells for heating the liquid mixture in the storage tank 48.

The apparatus illustrated schematically in FIGURE 3 is that portion of the system which is utilized for delivering liquid from the storage tank 48 into the refuse at a controlled rate in order to adjust the chemical character of the refuse as desired for subsequent processing. In general, two variables will determine the rate at which the liquid is introduced to the refuse. The first of these variables is the rate of progression of the refuse through the plant to the portion thereof by which it is converted to compost or other useful products. I have found that the rate of feed of refuse, such as municipal refuse, is, by virtue of the peculiar agglomerative characteristics of the refuse, directly related to the depth of the refuse 82 on the conveyer 80. In other words, the refuse 82 is so cohesive or agglomerative in nature that a relatively rigid bridge is formed transversely across the top of the conveyer 80 by the refuse, which bridge resists the slight downward pressure imposed by the pivoted paddle member 86, and provides a fairly uniform horizontal surface at the top thereof. As the constant speed conveyer number 80 moves the refuse 82 into the pulverizing device, the pivoted paddle member 86 is pivoted in accordance with the quantity of refuse moved upon the conveyer. The end 84 of the paddle member 86 follows the upper surface of the refuse as it reaches the end of the conveyor 80, and the degree of pivotation of the paddle member 86 will correspond to the degree of loading on the conveyor 80. The resistance offered by the variable electrical resistance 94 will in turn correspond to the amount by which the paddle member 86 is pivoted. Finally, the speed at which the variable speed motor 102 is driven will be governed by the resistance setting upon the variable resistance 94, so that the speed of the motor 102 is directly related to the rate at which the refuse 82 is moved into the refuse pulverizing apparatus by the constant speed conveyor 80. As the variable speed motor 102 rotates, it drives the positive displacement pump 68 through the belt or chain 104, with the speeds of pump and motor being directly proportional to each other. It will thus be apparent that the rate at which the liquid mixture contained in the storage tank 48 is pumped through the conduit 76 and into the refuse contained in the pulverizing device is directly proportional to the rate at which the refuse 82 is being introduced into the pulverizing device by the conveyor 80.

A second variable which determines the rate at which the liquid mixture is to be introduced to the refuse is the innate chemical characteristic of the refuse. When the processing of municipal refuse is involved, the moisture content of the refuse which is collected and brought to the refuse processing plant may vary from municipality to municipality and even from truck load to truck load. It is therefore highly desirable to know the innate moisture content of the refuse which is to be processed in order to know how much water must be added to the refuse in order to bring the moisture content to an optimum level.

The same is true to a lesser degree of the carbon to nitrogen ratio of the raw refuse.

In order to introduce a corrective factor to the control of the variable speed motor 122 which is obtained through the resistor 94, a second variable resistor 104 is provided which may be manually set to correspond to a given innate or inherent moisture content, and is connected to the control winding 100 of the variable speed motor 102. Ordinarily, the innate moisture content of the refuse will remain substantially constant over a relatively long period of time such as over a number of truck loads of refuse or perhaps even all times for a given municipality. Therefore, it is generally sufficient to set the variable resistor 104 for a given known moisture content, and then not alter this setting for a substantial period of time until another check of the innate moisture content of the incoming refuse has been made.

Like the three-way valves 18 and 20 associated with the ammonia storage tank 10, the three-way valves 64 and 70 which are provided in association with the storage tank 48, also function to allow for greater flexibility in the operation of the storage tank. Thus, if it should be desired to charge an additional liquid chemical to the mixing manifold 28, from a barrel, tank truck or other source this may be accomplished utilizing the conduit 66, three-way valve 64, three-way valve 70, and the conduit 74 which interconnects the three-way valve 70 and the mixing manifold 28. Alternatively, a different mixture from that contained in the storage tank 48 might be introduced to the refuse 82 by charging such mixture through the conduit 66, three-way valve 64, three-way valve 70 and conduit 76.

From the foregoing description of a preferred embodiment of the invention, it will be understood that the system provides continuous and accurate control of the rate of addition and the proportion in which a plurality of desirable chemicals may be added to refuse which is to be subsequently processed to useful products. Control of the mixing and the amounts of chemicals added to a liquid storage tank is essentially completely automatic, and maximum utilization of the useful liquid materials which are initially drained from the raw refuse as it is received is achieved. The operation of the system is therefore very economical since a minimum amount of fresh water is utilized for addition to the refuse to adjust its moisture content while maximum usage of the liquid materials extracted from the raw refuse is made.

In FIGURE 5, a modified embodiment of the invention is illustrated. Water from either the sump or a fresh water source is fed to the pulverizing device 77 through a pipe 140. A flow meter 142 is first interposed in the pipe 140 to measure the total water used over a given period, such as during one day's operation. A solenoid valve 144 is interposed in the pipe 140 and is connected electrically to the roller 145 at the end of the conveyor 80 to completely cut off the water supply when the conveyor 80 is stopped. Conversely, the solenoid valve 144 is completely open whenever the conveyer 80 is running. A by-pass pipe 146 leads from the pipe 140 between the flow meter 142 and the solenoid valve 144 directly to the pulverizing device 77 for use in the event of failure of the water proportioning and control system. A manual shutoff valve 148 is interposed in the by-pass pipe 146 and is normally closed.

A manual control valve 150 is interposed in the pipe 140 downstream from the solenoid valve 144 to provide a metering of the water in accordance with the average connate moisture content of the refuse 82 being fed to the pulverizing device 77 when the conveyer 80 is filled to maximum capacity. For example, let it be assumed that the connate moisture content of the refuse being fed to the pulverizing device is about twenty-five percent. The control valve 150 may then be opened three-fourths of the way. If the moisture content of refuse 82 decreases to ten percent, the valve 150 would be open more, say seven-eighths of the way. Calibration of the valve 150 may be easily effected by calculating the maximum rate of discharge of refuse 82 from the conveyer 80, and the amount of additional water which is required for various initial moisture contents of refuse. A suitable dial 152 is preferably provided on the control valve 150 to facilitate the quick and accurate setting of the valve. The moisture content of the refuse 82 being loaded upon the conveyer 80 is periodically checked, and the valve 150 is regulated to correspond to changes in this moisture content. In some areas, the moisture content of refuse will not vary over five percent, and, in that event, the valve 150 will seldom be adjusted. On the other hand, the moisture content in some areas may vary considerably with each truckload of refuse (normally about four tons). In this event, the moisture content of the refuse needs to be checked each time a new load of refuse is fed to the conveyer 80 and the valve 150 adjusted accordingly.

The regulation of water which is being added when less than the maximum capacity of refuse 82 is being conveyed on the conveyor 80 is made by the metering valve 156 which is interposed in the pipe 140 downstream from the manual control valve 150. The metering valve 156 may be of any desired design, provided that it is calibrated, and has a substantially linear response. That is, when the operating shaft 158 of the metering valve 156 is turned to open the valve one-fourth of the way, one-fourth of the maximum flow through the valve may be obtained; and when the valve 156 is opened half way, one-half of the maximum flow is obtained through the valve, etc., The degree of opening of valve 156 is controlled in accordance with the volume of refuse 82 which is being fed on the conveyor 80 into the pulverizing device 77 by means of the pivoted paddle member 86. This paddle member is pivotally mounted in the same way of shown in FIG. 3 and as hereinbefore described. Also, its form is identical to that illustrated in FIG. 4.

In the modified embodiment illustrated in FIG. 5 a lever 160 is rigidly secured to the paddle member 86 for pivoting movement therewith. Another lever 162 is rigidly secured to the operating shaft 158 of valve 156. A sectional rod 164 is pivotally connected to the levers 160 and 162 to pivot the lever 162 in response to pivoting movement of the paddle member 86 and lever 160 for operating the valve 156. The sections of the rod 164 are interconnected by a turnbuckle 166 in order that the rod can be adjusted in length, and the lever 162 can be positioned to close the valve 156 when the paddle member 86 is in contact with the discharge end of conveyor 80. It will also be noted that several holes 168 are provided along the length of the lever 162 for selective connection of the sectional rod 164. Thus, turning of the lever 162 can be related to the turning of the lever 160 in various ways. Normally, full opening of the valve 156 will require turning of the lever 162 approximately 90 degrees, whereas the paddle member 86 and lever 160 will normally pivot a lesser amount (such as thirty degrees) between maximum and minimum feeds of refuse 82 off of the conveyor 80. Thus, the rod 164 will normally be connected closer to the pivot point of the lever 162 than to the pivot point of lever 160 in order to multiply the turning of the lever 160. For example, the lever 162 may be turned three times as far as the lever 160 to provide a full opening of the valve 156 when the maximum amount of refuse 82 is being discharged from the conveyor 80.

In order to adjust the carbon to nitrogen ratio in the refuse, the modified embodiment of the invention illustrated in FIG. 5 provides for the addition of anhydrous ammonia to the pipeline from an anhydrous ammonia storage tank 170. The tank 170 is positioned above the pipe 140 to provide for gravity flow of the ammonia from the tank 170 through a pipe 172 into a jet pump 174 interposed in the water feed pipe 140. When ammonia is present in the end of the pipe 172 connected to the pump 174, water flowing through the pipe 140 will draw the ammonia into the water stream and mix the ammonia with the water as the water flows into the pulverizing device 77. Thus, the injection of anhydrous ammonia into the water feed produces no back pressure on the anhydrous ammonia feed pipe 172.

A calibrated metering valve 176 of the same type as the metering valve 156 is interposed in the pipe 172 between the tank 170 and jet pump 174 to regulate the feed of anhydrous ammonia. A lever 178 is rigidly connected to the operating shaft 177 of the metering valve 176 and is connected to the lever 162 by a sectional rod 180. The sections of the rod 180 are connected through a turn-buckle 182. Thus, the metering valve 176 will also be controlled by the paddle member 86 to proportion the anhydrous ammonia. It will also be noted that the rod 180 may be connected to any one of various holes 194 in the lever 178 to control the amount of opening and closing of the metering valve 176 in the desired relation with respect to the opening and closing of the water metering valve 156. It will further be understood by those acquainted with the refuse compositing art that any other type of additive such as sewage sludge or chicken blood may be stored in the tank 170 and added to the water and fed to the pulverizing device 77 instead of the anhydrous ammonia if it is desirable to control some other characteristic of the refuse.

As will be apparent to those skilled in the art, various changes may be made in the form, construction and arrangement of the parts of the apparatus without departure from the basic principles of the invention or sacrifice of the advantages thereof. Such changes are deemed to be included within the scope and spirit of the invention unless necessarily excluded therefrom by the following claims when broadly construed.

I claim:

1. Apparatus for simultaneously controlling the moisture and chemical content of refuse to be subsequently processed to useful products, comprising:
   a source of a chemical to be added to said refuse;
   a source of water;
   a mixing manifold for intimately mixing said chemical and said water;
   means for delivering said chemical to said manifold at a desired rate;
   means for delivering water from said source to said manifold at a desired rate;
   a storage tank for receiving a mixture of said chemical and said water from said mixing manifold and retaining it in storage;
   sensing means for sensing the rate of feed of said refuse to said subsequent processing;
   and means responsive to said sensing means for delivering said mixture from said storage tank to said refuse at a rate proportional to the rate at which refuse is fed to said subsequent processing.

2. Apparatus as claimed in claim 1 and further characterized to include:
   a source of a randomly available aqueous mixture which may desirably be added to said refuse with said chemical and in place of said water;
   means for delivering said aqueous mixture to said mixing manifold at a desired rate when said aqueous mixture is available;
   level sensing means in said storage tank for sensing the level of the liquid mixture therein at three vertical levels;
   and means responsive to said level sensing means for starting and stopping the delivery of said water, said chemical and said aqueous mixture to said mixing manifold in accordance with the level of the liquid mixture in said storage tank whereby the amounts of water, aqueous mixture and chemical in said storage tank may be controlled as dictated by economy and the capacity of the storage tank.

3. Apparatus as claimed in claim 1 and further characterized to include means for adjustably controlling said means for delivering said mixture from said storage tank to said refuse in accordance with the innate moisture content of said refuse.

4. Apparatus as claimed in claim 1 wherein said sensing means comprises a conveyor supporting a bed of said refuse thereon and moving said refuse to the location of said subsequent processing;
   a pivoted paddle member communicating at its free end with the refuse moved by said conveyor and pivoted in accordance with variations in the quantity of refuse on said conveyor;
   and a variable electrical resistance mechanically linked to said paddle for resistance variation in response to the pivotation of said paddle.

5. Apparatus as claimed in claim 1 wherein said means responsive to said sensing means comprises a pump for pumping said mixture from said tank to said refuse;
   and a variable speed motor responsive to said sensing means and drivingly connected to said pump for driving said pump at a speed proportional to the sensed rate of feed of said refuse.

6. Apparatus as claimed in claim 2 wherein said level sensing means comprises float switches positioned at three vertical levels of said storage tank;
   and wherein said means responsive to said level sensing means comprises a fluid driven pump for pumping said chemical to said mixing manifold from its source;
   a first solenoid valve for controlling the input of power fluid to said fluid driven pump;
   a second solenoid valve in said water delivering means for controlling the flow of water to said mixing manifold from its source;
   a third solenoid valve in said aqueous mixture delivering means for controlling the delivery of the aqueous mixture to said mixing manifold from its source;
   and electrical circuitry including said solenoid valves and said float switches for (a) opening said first solenoid valve when the level of liquid in said tank falls below the lowermost float switch, (b) opening said second solenoid valve when said aqueous mixture is not available and the level of said liquid in said storage tank falls below the lowermost float switch, (c) closing said second solenoid valve when the liquid in said tank reaches the middle float switch; and (d) closing said first and opening said third solenoid valves when the level of liquid in said storage tank reaches the uppermost float switch.

7. Apparatus as claimed in claim 4 wherein said means responsive to said sensing means includes a pump for pumping said mixture from said tank to said refuse;
   an electrically driven, variable speed motor connected to said variable resistance for speed variation in accordance with the variation of said resistance, and drivingly connected to said pump for driving said pump at a speed proportional to the rate of feed of said refuse; and further characterized to include;
   an electrical circuit including said electrically driven motor; and
   a switch cooperating with said conveyor to energize said motor when said conveyor is in motion and to de-energize said motor when said conveyor is stopped.

8. Apparatus as claimed in claim 1 and further characterized to include a conduit coiled in the bottom of said storage tank and extending at each of its ends through the wall of said tank for conveying a fluid into heat exchange relation with the liquid in said storage tank.

9. Apparatus as claimed in claim 6 wherein said source of a randomly available aqueous mixture comprises a sump for collecting bacteria laden drippings and drainage from said refuse as it is initially received in its raw state for processing;

said means for delivering said aqueous mixture to said manifold comprises a sump pump, and a conduit between said sump pump and said manifold;

and wherein said electrical circuitry includes switch means cooperating with said sump pump and operable to open the electrical circuit including said second solenoid valve to close said second solenoid valve when said sump pump is energized whereby when said drippings and drainage are being pumped to said manifold by said sump pump, the water will not be delivered thereto.

10. Apparatus for adjusting the liquid and chemical content of refuse to be subsequently processed to useful products, comprising:
- a source of a first liquid chemical to be added to said refuse;
- a source of a second liquid chemical to be added to said refuse in predetermined proportion to the amount of said first liquid chemical added to said refuse;
- mixing means for intimately mixing said first and second liquid chemicals;
- means for individually delivering each of said chemicals to said mixing means at a desired, predetermined rate;
- a storage tank for receiving the mixture of said first and second liquid chemicals from said mixing means and retaining it in storage;
- sensing means for sensing the rate of feed of said refuse to said subsequent processing; and
- means responsive to said sensing means for delivering said mixture from said storage tank to said refuse at a rate proportional to the rate at which refuse is fed to said subsequent processing.

11. In a system for converting waste material in the nature of municipal refuse to useful products, the improvement which comprises:
- a horizontal conveyor for moving the refuse from one location to another;
- a pivoted paddle member communicating at one of its ends with the refuse moved by said conveyor, and pivoted in accordance with variations in the quantity of refuse on said conveyor;
- a source of a first liquid additive to be added to the refuse;
- a source of a second liquid additive which may desirably be intermixed with said first-mentioned liquid additive for addition to said refuse;
- a mixing device for mixing said first and second liquid additives;
- means for conveying the first liquid additive from said source to said mixing device;
- a metering valve for metering the liquid flow in said conveying means;
- means for conveying the second liquid additive from its source to said mixing device;
- a second metering valve in said second liquid additive conveying means for metering the flow of said second liquid additive into said mixing device;
- adjustable control means interconnecting said first and second metering valves and said pivoted paddle member for adjustably correlating the rates of conveyance of said refuse, and said first and second liquid additives; and
- means for conveying the mixed first and second liquids from said mixing device to the refuse.

References Cited by the Examiner

UNITED STATES PATENTS

| | | | |
|---|---|---|---|
| 2,072,442 | 3/1937 | Collins | 222—57 X |
| 2,206,237 | 7/1940 | Roberts | 222—57 X |
| 2,218,695 | 10/1940 | Leathermann | 71—8 |
| 2,428,100 | 9/1947 | Soulen | 222—57 X |
| 2,867,521 | 1/1959 | Jeffreys | 71—8 |
| 2,929,688 | 3/1960 | Riker et al. | 23—259.1 |
| 2,953,440 | 9/1960 | Claudy | 23—253 |
| 3,006,736 | 10/1961 | Green | 23—253 |

MORRIS O. WOLK, *Primary Examiner.*

MAURICE A. BRINDISI, *Examiner.*